United States Patent
Nelogal et al.

(10) Patent No.: US 8,938,584 B2
(45) Date of Patent: Jan. 20, 2015

(54) SYSTEM AND METHOD TO KEEP PARITY CONSISTENT IN AN ARRAY OF SOLID STATE DRIVES WHEN DATA BLOCKS ARE DE-ALLOCATED

(75) Inventors: Chandrashekar Nelogal, Round Rock, TX (US); Kevin T. Marks, Georgetown, TX (US)

(73) Assignee: Dell Products, LP, Round Rock, TX (US)

( * ) Notice: Subject to any disclaimer, the term of this patent is extended or adjusted under 35 U.S.C. 154(b) by 444 days.

(21) Appl. No.: 13/460,262

(22) Filed: Apr. 30, 2012

(65) Prior Publication Data

US 2013/0290608 A1    Oct. 31, 2013

(51) Int. Cl.
*G06F 12/00*    (2006.01)

(52) U.S. Cl.
USPC ............................................................ 711/114

(58) Field of Classification Search
CPC ... G06F 3/0689; G06F 3/0643; G06F 3/0679; G06F 12/0246
USPC ................................... 711/103, 114, E12.008
See application file for complete search history.

(56) References Cited

U.S. PATENT DOCUMENTS

| | | |
|---|---|---|
| 2009/0240881 A1 | 9/2009 | Halloush et al. |
| 2011/0258365 A1 | 10/2011 | Cho |
| 2012/0030410 A1 | 2/2012 | Cho |
| 2012/0072661 A1 | 3/2012 | Cho |
| 2013/0246722 A1* | 9/2013 | Suzuki et al. ................. 711/162 |

* cited by examiner

*Primary Examiner* — Charles Rones
*Assistant Examiner* — Ryan Dare
(74) *Attorney, Agent, or Firm* — Larson Newman, LLP

(57) ABSTRACT

A method comprises sending a first command to a solid state drive (SSD), the first command indicating that the SSD can de-allocate a first plurality of logical block addresses (LBAs), and calculating first parity data for a redundant array of independent disks (RAID) array that includes the SSD in response to receiving a first reply from the SSD indicating that the first LBAs were de-allocated by the SSD. The first parity data is calculated based upon the first LBAs including all logical zeros.

20 Claims, 4 Drawing Sheets

| UNMAP User Data | Physical Block – 1<br>210 | Physical Block – 1<br>220 | Physical Block – 1<br>230 |
|---|---|---|---|
| 240 | Allocated | Allocated | Allocated |
| 242 | Allocated | De-allocated | Allocated |
| 244 | Allocated | Allocated | Allocated |
| 240, 242 | De-allocated | De-allocated | Allocated |
| 242, 244 | Allocated | De-allocated | De-allocated |
| 240, 242, 244 | De-allocated | De-allocated | De-allocated |

250

100

SYSTEM AND METHOD TO KEEP PARITY CONSISTENT IN AN ARRAY OF SOLID STATE DRIVES WHEN DATA BLOCKS ARE DE-ALLOCATED

FIELD OF THE DISCLOSURE

This disclosure relates generally to information handling systems, and relates more particularly to keeping parity consistent in an array of solid stated drives when data blocks are de-allocated.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems. An information handling system can include virtual machines that run operating systems and applications on a common host system.

A solid-state drive (SSD) is a data storage device that uses integrated circuit memory such as a flash memory to provides persistent data storage. A redundant array of independent disks (RAID) array combines multiple data storage devices into a logical unit to provide improved performance and redundancy. A RAID array can include SSDs.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion focuses on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

Figure 1:
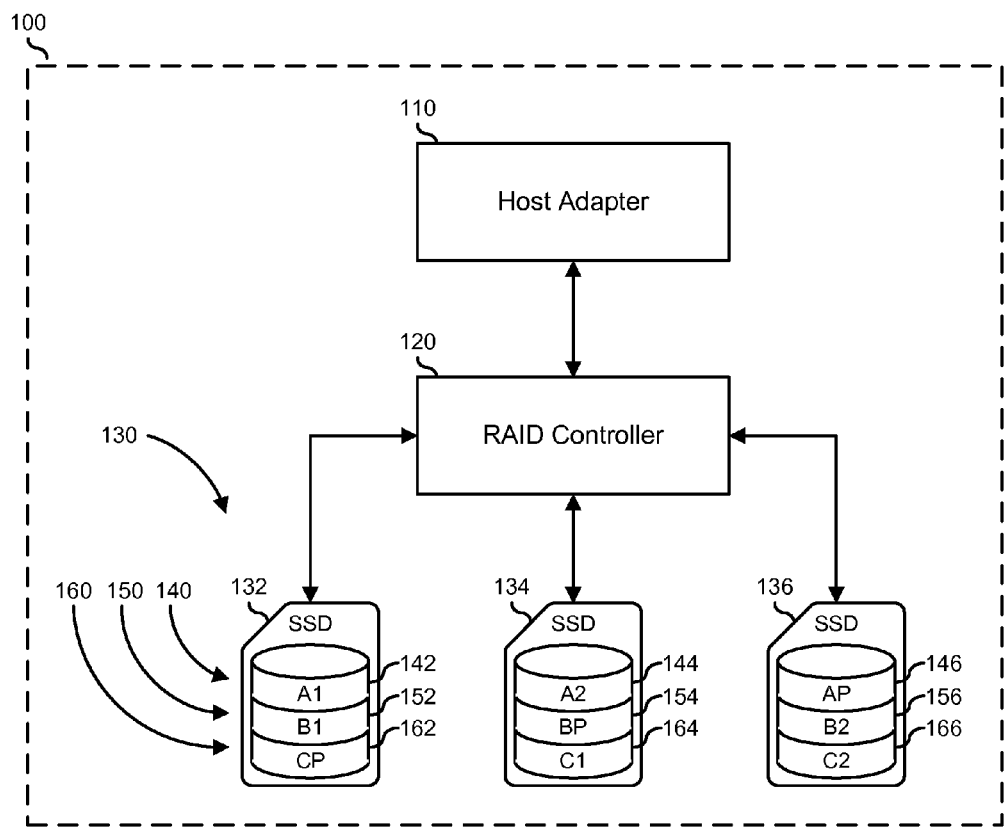
FIG. 1 is a block diagram of an information handling system according to an embodiment of the present disclosure.

FIG. 1 illustrates an information handling system 100. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, information handling system 100 includes a host adapter 110, a RAID controller 120, and a RAID array 130. RAID array 130 includes SSDs 132, 134, and 136. Host adapter 110 represents a data storage adapter of information handling system 100, and operates to receive data storage and retrieval requests from the information handling system, and to provide the requests to RAID controller 120. As such, host adapter 110 is configured to receive requests from information handling system 100 in a protocol associated with the information handling system, and to provide the requests to RAID controller 120 in a protocol associated with the RAID controller. For example, host adapter 110 can include a front-end interface such as a Peripheral Component Interconnect (PCI) interface, a PCI-X interface, a PCI-Express (PCIe) interface, or another front-end interface, and a back-end interface such as an AT attach (ATA) interface, a Parallel-ATA (PATA) interface, a Serial-ATA (SATA) interface, a Small Computer System Interface (SCSI) interface, a Serial Attach-SCSI (SAS) interface, a Fibre Channel interface, or another back-end interface. Host adapter 110 can include a device on a main-board of information handling system 100, an add-in card of the information handling system, an external device, another data storage adapter, or a combination thereof.

RAID controller 120 represents a disk control device of information handling system 100, and that operates to receive data storage and retrieval requests from host adapter 110, and to manage disk storage devices such as SSDs 132, 134, and 136. In particular, RAID controller 120 operates to combine SSDs 132, 134, and 136 into a logical unit (that is, as RAID array 130). In this way, host adapter 110 makes data storage and retrieval requests that are directed to RAID array 130, and RAID controller 120 distributes the requests among SSDs 132, 134, and 136. As illustrated, RAID controller 120 operates RAID array 130 in a RAID 5 configuration using block level striping and with parity information distributed across SSDs 132, 134, and 136. RAID 5 is used herein for illustrative purposes, and the systems and methods described are not intended to be limited to RAID 5 applications only, but can be applied to other parity-based RAID levels, such as RAID 2, RAID 3, RAID 4, RAID 6, or other non-standard RAID levels or architectures. RAID controller 120 receives requests from host adapter 110 and provides the requests to SSDs 132, 134, and 136 in a common protocol associated with the back-end protocol of the host adapter. For example, RAID controller 120 can include front-end and back-end interfaces such as ATA interfaces, PATA interfaces, SATA interfaces, SAS interfaces, SCSI interfaces, Fibre Channel interfaces, or other front-end and back-end interfaces. In a particular embodiment, RAID controller 120 initializes SSDs 132, 134, and 136 by performing device discovery, including issuing a READ_CAPACITY command. In response, SSDs 132, 134, and 136 will reply with a Logical Block Provisioning Read Zeros (LBPRZ) bit set to a logical one (1), indicating that a read operation to a de-allocated block will return data with all bits set to a logical zero (0).

RAID array 130 is configured as a RAID 5 array using block level striping and distributed parity. RAID array 130 stores data in stripes 140, 150, and 160 across SSDs 132, 134, and 136. Stripe 140 includes a first data strip 142 on SSD 132, a second data strip 144 on SSD 134, and a parity strip 146 on SSD 136. Stripe 150 includes a first data strip 152 on SSD 132, a parity strip 154 on SSD 134, and a second data strip 156 on SSD 136. Stripe 160 includes a parity strip 162 on SSD 132, a first data strip 164 on SSD 134, and a second data strip 166 on SSD 136. Note that the logical view presented by RAID array 130 to host adapter 110 and to an operating system of information handling system 100 differs significantly from the physical storage of the data in stripes 140, 150, and 160 on SSDs 132, 134, and 136. This is due to the characteristics of the solid state memory devices that make up SSDs 132, 134, and 136, and the control of data storage within the SSDs. For example, the controller on SSDs 132, 134, and 136 may place data within contiguous physical blocks when the data is first provided to the SSDs, but due to factors such as wear leveling and garbage collection, the data may move to different physical blocks over time. In order to represent the data stored on SSDs 132, 134, and 136 in the same logical view as it was provided to the SSDs by the operating system, the SSDs each include a Flash Translation Layer (FTL) that maintains an updated map between the logical view of RAID controller 120 and the physical blocks where the data is stored on the SSDs.

In a particular embodiment, the operating system determines that some blocks of data are no longer in use, and that the data blocks can be de-allocated from the data storage devices associated with the operating system. For example, a particular file can be deleted and the operating system can de-allocate the blocks associated with the file from a data storage device that stores the file. In a particular embodiment, the operating system is aware that the data storage includes SSDs and issues a command to inform the SSDs that the blocks of data can be de-allocated. For example, where the SSDs operate in accordance with an ATA protocol, the TRIM bit of the DATA SET MANAGEMENT command can be set to a logical one (1) to inform the SSDs that data blocks associated with the command can be de-allocated. In another example, where the SSDs operate in accordance with a SCSI protocol, the UNMAP command can be sent to inform the SSDs that data blocks associated with the command can be de-allocated. Note that as disclosed herein, the SCSI UNMAP command is provided as an exemplary illustration but that the disclosure is not limited thereby, and that the teachings herein are also applicable within the ATA protocol or within other protocols for managing SSDs.

In a particular embodiment, an UNMAP command is issued to host adapter 120 by the operating system, the host adapter forwards the UNMAP command to RAID controller 120, and the RAID controller modifies and forwards the UNMAP command to one or more of SSDs 132, 134, and 136, depending on which SSD includes the data associated with the logical block addresses (LBAs) provided by the UNMAP command. RAID controller 120 also determines the parity data associated with any stripes that are affected by the UNMAP command.

The UNMAP command is an advisory command to SSDs 132, 134, and 136. As such, there are cases when SSDs 132, 134, and 136 take no action in response to receiving an UNMAP command. For example if SSDs 132, 134, and 136 allocate the physical blocks of the solid state memory devices on a fixed granularity, but the UNMAP command is for only a portion of the allocated granularity, then SSDs 132, 134, and 136 may keep physical blocks that include de-allocated logical blocks allocated. Further, the UNMAP command operates on each logical block independently of the operation on other logical blocks included in the UNMAP command, such that, in response to a single UNMAP command, some logical blocks become de-allocated, while others remain allocated.

Figures 2, 3:
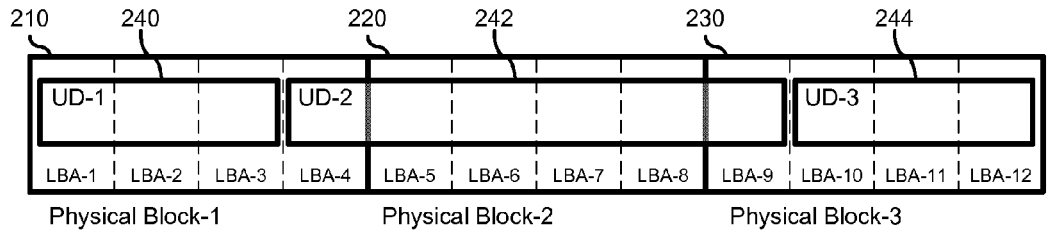
FIG. 2 is a block diagram of a strip of a RAID array of SSDs according to an embodiment of the present disclosure.
FIG. 3 is a table showing various UNMAP scenarios associated with the strip of FIG. 2.

FIG. 2 illustrates a portion 200 of an SSD similar to SSDs 132, 134, and 136, including physical blocks 210, 220, and 230. Physical block 210 includes LBAs 1-4, physical block 220 includes LBAs 5-8, and physical block 230 includes LBAs 9-12. LBAs 1-3 include data associated with first user data (UD) 240, LBAs 4-9 include data associated with second UD 242, and LBAs 10-12 include data associated with third UD 244.

FIG. 3 illustrates a table 250 showing various UNMAP scenarios associated with portion 200. For example, an UNMAP command can be issued by an operating system to the SSD device that includes portion 200. The UNMAP command can include UD 240, as shown in the first entry of table 250. Although the data associated with UD 240 resides in physical block 210, physical block 210 remains allocated because physical block 210 also includes a portion of UD 242. Physical blocks 220 and 230 also remain allocated because no portion of the data associated with UD 240 are included therein. When the UNMAP command includes UD 242, as shown in the second entry of table 250, only physical block 242 is de-allocated, because only physical block 242 exclusively stores data associated with UD 242. Physical blocks 210 and 230 remain allocated because in addition to portions of the data associated with UD 242, physical blocks 210 and 230 also include the data associated with UDs 240 and 244, respectively. The third entry of table 250 illustrates that physical blocks 210, 220, and 230 all remain allocated in response to an UNMAP command that includes UD 244, because the data associated with UD 244 is stored in physical block 240, along with a portion of the data associated with UD 242. The fourth entry of table 250 illustrates that physical blocks 210 and 220 are de-allocated, and physical block 230 remains allocated in response to an UNMAP command that includes UDs 240 and 242. The fifth entry of table 250 illustrates that physical block 210 remains allocated, and physical blocks 220 and 230 are de-allocated in response to an UNMAP command that includes UDs 242 and 244. Finally, the sixth entry of table 250 illustrates that physical blocks 210, 220, and 230 are all de-allocated in response to an UNMAP command that includes UDs 240, 242, and 244.

In a particular embodiment, in response to an UNMAP command, SSDs 132, 134, and 136 issue a reply to RAID controller 120. Because the UNMAP command is an advisory command, no error conditions are associated with the UNMAP command. However, the reply can be a GOOD reply that indicates that the UNMAP command was successfully executed, and that all physical blocks associated with the LBAs of the UNMAP command were de-allocated, or the reply can be a GOOD_WITH_SENSE reply that indicates that not all of the physical blocks were de-allocated. In another embodiment, a CHECK_CONDITION reply indicates that the UNMAP command encountered an error. In response to the CHECK_CONDITION reply, RAID controller 120 issues a REQUEST SENSE command, and the SSD 132, 134, or 136 issues an Additional Sense Code reply that includes an ADDITIONAL_SENSE_CODE/ADDITONAL_SENSE_CODE_Qualifier (ASC/ASCQ) code that indicates NOT_ALL_LOGICAL_BLOCKS_UNMAPPED.

When RAID controller 120 detects a GOOD reply, then the RAID controller determines that all of the LBAs associated with the UNMAP command have been de-allocated, and the RAID controller assumes that all de-allocated blocks include logic zeros (0), determines new parity data for each affected stripe, and writes the new parity data to RAID array 130. However, when RAID controller 120 detects a GOOD_WITH_SENSE reply or receives the KEY_CODE_QUALIFIER reply with the NOT_ALL_LOGICAL_BLOCKS_UNMAPPED ASC/ASCQ code, the RAID controller is unaware of which physical blocks have been de-allocated, and which have not. As such, in response to a GOOD_WITH_SENSE reply, RAID controller 120 issues a GET_LBA_STATUS command to whichever SSD 132, 134, or 136 provided the GOOD_WITH_SENSE reply. The GET_LBA_STATUS command includes the LBAs that were included in the UNMAP command. In response to the GET_LBA_STATUS request, SSD 132, 134, or 136 provides the current status of each LBA that is included in the GET_LBA_STATUS request. If the status returned for a particular LBA is "allocated", then RAID controller 120 determines that the parity associated with the particular LBA is unchanged. However, if the status returned for another LBA is "de-allocated", then RAID controller 120 assumes that the LBA includes logic zeros (0), determines new parity data for the LBA, and writes the new parity data for the stripe to RAID array 130.

Figure 4:
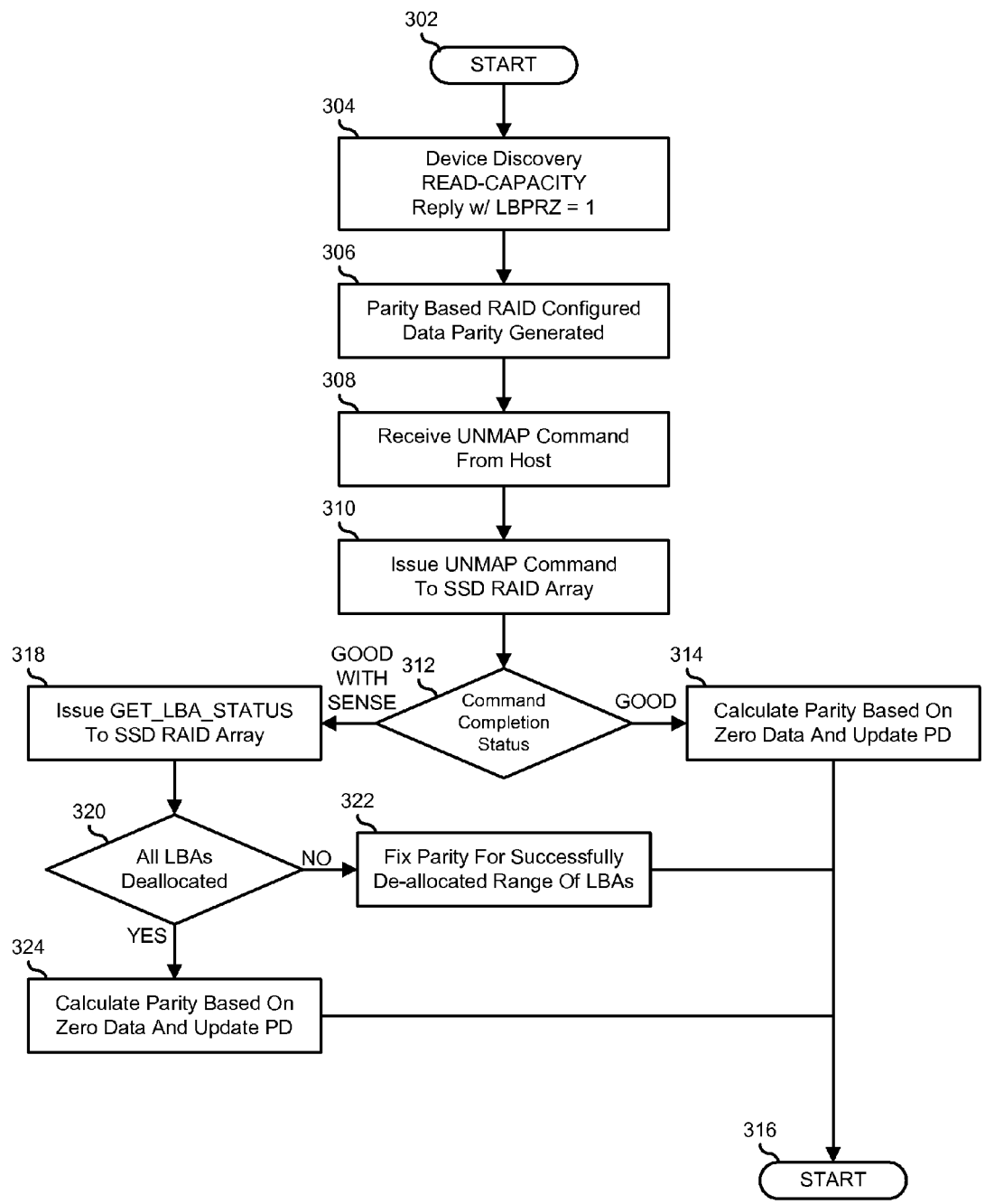
FIG. 4 is a flow diagram of a method of keeping parity consistent in an array of solid stated drives when data blocks are de-allocated according to an embodiment of the present disclosure.

FIG. 4 illustrates a method of keeping parity consistent in an array of SSDs when data blocks are de-allocated, starting at block 302. A RAID controller or a host adapter performs device discovery, including issuing a READ_CAPACITY command and receiving a reply with a LBPRZ set to a logical 1 in block 304. In this way, for example, SSDs 132, 134, and 136 can be set to issue logical zeros (0) in response to a read to a de-allocated logical block. A parity-based RAID array is configured, and parity data (PD) is generated for data stored in the RAID array during write operations in block 308. For example RAID array 130 can be configured as a RAID 5 array. An UNMAP command for one or more LBAs received from a host system in block 308. For example, an operating system of information handling system 100, or host adapter 110 can issue the UNMAP command. The UNMAP command is issued from the RAID controller to an associated SSD in block 310. For example, RAID controller 120 can send the UNMAP command to one or more of SSDs 132, 134, or 136.

A determination is made as to the command completion status returned by the SSDs in decision block 312. If the command completion status is a GOOD reply, the "GOOD" branch of decision block 312 is taken, thereby indicating that all LBAs identified by the UNMAP command were de-allocated, the data parity for the de-allocated LBAs is calculated and updated on the relevant strip based upon the return of logical zeros (0's) within the de-allocated LBAs in block 314, and the method ends in block 316. If the command completion status is a GOOD_WITH_SENSE reply, or an Additional Sense Code reply is received that indicates NOT_ALL_LOGICAL_BLOCKS_UNMAPPED, the "GOOD_WITH_SENSE" branch of decision block 312 is taken, and the RAID controller issues a GET_LBA_STATUS command to the appropriate SSDs, and a decision is made as to whether all LBAs are indicated to be de-allocated in decision block 320. If so, the "YES" branch of decision block 320 is taken, the data parity for all LBAs is calculated and updated based upon the return of logical zeros (0's) within the de-allocated LBAs in block 324, and the method ends in block 316. If not all LBAs are indicated to be de-allocated, the "NO" branch of decision block 320 is taken, and the parity for the successfully de-allocated blocks is calculated and updated in block 324, and the method ends in block 316.

Figure 5:
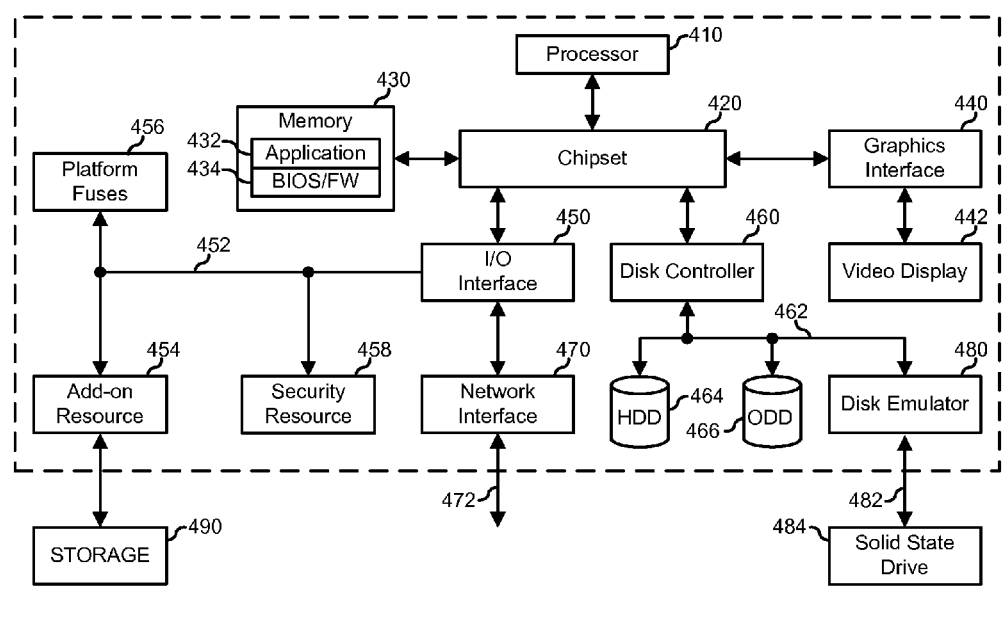
FIG. 5 is a functional block diagram illustrating an exemplary embodiment of an information handling system.

FIG. 5 is a block diagram illustrating an embodiment of an information handling system 400, including a processor 410, a chipset 420, a memory 430, a graphics interface 440, an input/output (I/O) interface 450, a disk controller 460, a network interface 470, and a disk emulator 480. In a particular embodiment, information handling system 400 is used to carry out one or more of the methods described herein. In another embodiment, one or more of the systems described herein are implemented in the form of information handling system 400.

Chipset 420 is connected to and supports processor 410, allowing the processor to execute machine-executable code. In a particular embodiment, information handling system 400 includes one or more additional processors, and chipset 420 supports the multiple processors, allowing for simultaneous processing by each of the processors and permitting the exchange of information among the processors and the other elements of the information handling system. Chipset 420 can be connected to processor 410 via a unique channel, or via a bus that shares information among the processor, the chipset, and other elements of information handling system 400.

Memory 430 is connected to chipset 420. Memory 430 and chipset 420 can be connected via a unique channel, or via a bus that shares information among the chipset, the memory, and other elements of information handling system 400. In another embodiment (not illustrated), processor 410 is connected to memory 430 via a unique channel. In another embodiment (not illustrated), information handling system 400 includes separate memory dedicated to each of the one or more additional processors. A non-limiting example of memory 430 includes static random access memory (SRAM), dynamic random access memory (DRAM), non-volatile random access memory (NVRAM), read only memory (ROM), flash memory, another type of memory, or any combination thereof.

Graphics interface 440 is connected to chipset 420. Graphics interface 440 and chipset 420 can be connected via a unique channel, or via a bus that shares information among the chipset, the graphics interface, and other elements of information handling system 400. Graphics interface 440 is connected to a video display 442. Other graphics interfaces (not illustrated) can also be used in addition to graphics interface 440 as needed or desired. Video display 442 includes one or more types of video displays, such as a flat panel display, another type of display device, or any combination thereof.

I/O interface 450 is connected to chipset 420. I/O interface 450 and chipset 420 can be connected via a unique channel, or via a bus that shares information among the chipset, the I/O interface, and other elements of information handling system 400. Other I/O interfaces (not illustrated) can also be used in addition to I/O interface 450 as needed or desired. I/O interface 450 is connected via an I/O interface 452 to one or more add-on resources 454. Add-on resource 454 is connected to a storage system 490, and can also include another data storage system, a graphics interface, a network interface card (NIC), a sound/video processing card, another suitable add-on resource or any combination thereof. I/O interface 450 is also connected via I/O interface 452 to one or more platform fuses 456 and to a security resource 458. Platform fuses 456 function to set or modify the functionality of information handling system 400 in hardware. Security resource 458 provides a secure cryptographic functionality and includes secure storage of cryptographic keys. A non-limiting example of security resource 458 includes a Unified Security Hub (USH), a Trusted Platform Module (TPM), a General Purpose Encryption (GPE) engine, another security resource, or a combination thereof.

Disk controller 460 is connected to chipset 420. Disk controller 460 and chipset 420 can be connected via a unique channel, or via a bus that shares information among the chipset, the disk controller, and other elements of information handling system 400. Other disk controllers (not illustrated) can also be used in addition to disk controller 460 as needed or desired. Disk controller 460 includes a disk interface 462. Disk controller 460 is connected to one or more disk drives via disk interface 462. Such disk drives include a hard disk drive (HDD) 464, and an optical disk drive (ODD) 466, and can include one or more disk drive as needed or desired. ODD 466 can include a Read/Write Compact Disk (R/W-CD), a Read/Write Digital Video Disk (R/W-DVD), a Read/Write mini Digital Video Disk (R/W mini-DVD, another type of optical disk drive, or any combination thereof. Additionally, disk controller 460 is connected to disk emulator 480. Disk emulator 480 permits a solid-state drive 484 to be coupled to information handling system 400 via an external interface 482. External interface 482 can include industry standard busses such as USB or IEEE 1394 (Firewire) or proprietary busses, or any combination thereof. Alternatively, solid-state drive 484 can be disposed within information handling system 400.

Network interface device 470 is connected to I/O interface 450. Network interface 470 and I/O interface 450 can be coupled via a unique channel, or via a bus that shares information among the I/O interface, the network interface, and other elements of information handling system 400. Other network interfaces (not illustrated) can also be used in addition to network interface 470 as needed or desired. Network interface 470 can be a network interface card (NIC) disposed within information handling system 400, on a main circuit board such as a baseboard, a motherboard, or any combination thereof, integrated onto another component such as chipset 420, in another suitable location, or any combination thereof. Network interface 470 includes a network channel 472 that provide interfaces between information handling system 400 and other devices (not illustrated) that are external to information handling system 400. Network interface 470 can also include additional network channels (not illustrated).

Information handling system 400 includes one or more application programs 432, and Basic Input/Output System and Firmware (BIOS/FW) code 434. BIOS/FW code 434 functions to initialize information handling system 400 on power up, to launch an operating system, and to manage input and output interactions between the operating system and the other elements of information handling system 400. In a particular embodiment, application programs 432 and BIOS/FW code 434 reside in memory 430, and include machine-executable code that is executed by processor 410 to perform various functions of information handling system 400. In another embodiment (not illustrated), application programs and BIOS/FW code reside in another storage medium of information handling system 400. For example, application programs and BIOS/FW code can reside in HDD 464, in a ROM (not illustrated) associated with information handling system 400, in an option-ROM (not illustrated) associated with various devices of information handling system 400, in storage system 490, in a storage system (not illustrated) associated with network channel 472, in another storage medium of information handling system 400, or a combination thereof. Application programs 432 and BIOS/FW code 434 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-ona-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   sending a first command to a solid state drive (SSD), the first command indicating that the SSD can de-allocate a first plurality of logical block addresses (LBAs);
   calculating first parity data for a redundant array of independent disks (RAID) array that includes the SSD in response to receiving a first reply from the SSD indicating that the first LBAs were de-allocated by the SSD, wherein the first parity data is calculated based upon the first LBAs including all logical zeros;
   sending a second command to the SSD, the second command indicating that the SSD can de-allocate a second plurality of LBAs;
   sending a third command to the SSD in response to receiving a second reply from the SSD indicating that not all of the second LBAs were de-allocated by the SSD, the third command directing the SSD to provide information on the status of the second LBAs; and
   calculating second parity data for the RAID array in response to receiving a third reply from the SSD.

2. The method of claim 1, wherein:
   the first command and the second command each comprise a Small Computer System Interface (SCSI) UNMAP command; and
   the first reply comprises a SCSI GOOD status code.

3. The method of claim 2, wherein the second reply comprises a SCSI GOOD_WITH_SENSE status code.

4. The method of claim 3, wherein the second reply includes an additional sense code/additional sense code qualifier (ASC/ASCQ) pair.

5. The method of claim 1, wherein the first command and the second command each comprise an AT attach (ATA) TRIM command.

6. The method of claim 1, wherein the second parity data is calculated based upon the subset of LBAs including all logical zeros.

7. The method of claim 1, wherein the RAID array comprises a RAID 5 array.

8. An apparatus comprising:
   a processor; and
   computer-readable medium including code for causing the processor to carry out a method, the method comprising:
      sending a first command to a solid state drive (SSD), the first command indicating that the SSD can de-allocate a first plurality of logical block addresses (LBAs);
      calculating first parity data for a redundant array of independent disks (RAID) array that includes the SSD in response to receiving a first reply from the SSD indicating that the first LBAs were de-allocated by the SSD, wherein the first parity data is calculated based upon the first LBAs including all logical zeros (0);
      sending a second command to the SSD, the second command indicating that the SSD can de-allocate a second plurality of LBAs;
      sending a third command to the SSD in response to receiving a second reply from the SSD indicating that not all of the second LBAs were de-allocated by the SSD, the third command directing the SSD to provide information on the status of the second LBAs; and
      calculating second parity data for the RAID array in response to receiving a third reply from the SSD.

9. The apparatus of claim 8, wherein:
   the first command and the second command each comprise a Small Computer System Interface (SCSI) UNMAP command; and
   the first reply comprises a SCSI GOOD status code.

10. The apparatus of claim 9, wherein the second reply comprises a SCSI GOOD_WITH_SENSE status code.

11. The apparatus of claim 10, wherein the second reply includes an additional sense code/additional sense code qualifier (ASC/ASCQ) pair.

12. The apparatus of claim 8, wherein the first command and the second command each comprise an AT attach (ATA) TRIM command.

13. The apparatus of claim 8, wherein the second parity data is calculated based upon the subset of LBAs including all logical zeros.

14. The apparatus of claim 8, wherein the RAID array comprises a RAID 5 array.

15. A redundant array of independent disks (RAID) controller comprising:
   a processor; and
   code executable by the processor to:
      send a first command to a solid state drive (SSD), the first command indicating that the SSD can de-allocate a first plurality of logical block addresses (LBAs);
      calculate first parity data for a RAID array that includes the SSD in response to receiving a first reply from the SSD indicating that the first LBAs were de-allocated by the SSD, wherein the first parity data is calculated based upon the first LBAs including all logical zeros;
      send a second command to the SSD, the second command indicating that the SSD can de-allocate a second plurality of LBAs;
      send a third command to the SSD in response to receiving a second reply from the SSD indicating that not all of the second LBAs were de-Oallocated by the SSD, the third command directing the SSD to provide information on the status of the second LBAs; and
      calculate second parity data for the RAID array in response to receiving a third reply from the SSD.

16. The RAID controller of claim 15, wherein:
the first command and the second command each comprise a Small Computer System Interface (SCSI) UNMAP command; and
the first reply comprises a SCSI GOOD status code.

17. The RAID controller of claim 16, wherein the second reply comprises a SCSI GOOD_WITH_SENSE status code.

18. The RAID controller of claim 16, wherein the second reply includes an additional sense code/additional sense code qualifier (ASC/ASCQ) pair.

19. The RAID controller of claim 15, wherein the first command and the second command each comprise an AT attach (ATA) TRIM command.

20. The RAID controller of claim 15, wherein the second parity data is calculated based upon the subset of LBAs including all logical zeros.

* * * * *